United States Patent
Hellström et al.

[11] Patent Number: 6,004,081
[45] Date of Patent: Dec. 21, 1999

[54] TOOL FOR METAL CUTTING

[75] Inventors: Lars Hellström, Årsunda; Stefan Roman, Sandviken; Göran Pantzar, Årsunda, all of Sweden; Erwin Kemper, Mülheim-Ruhr; Stefan Scherbarth, Neuss, both of Germany

[73] Assignee: Sandvik AB, Sweden

[21] Appl. No.: 08/983,038

[22] PCT Filed: Jul. 11, 1996

[86] PCT No.: PCT/SE96/00938

§ 371 Date: Mar. 27, 1998

§ 102(e) Date: Mar. 27, 1998

[87] PCT Pub. No.: WO97/03779

PCT Pub. Date: Feb. 6, 1997

[30] Foreign Application Priority Data

Jul. 18, 1995 [SE] Sweden .................................. 9502645
Dec. 29, 1995 [SE] Sweden .................................. 9504688

[51] Int. Cl.$^6$ .................................................... B23B 27/16
[52] U.S. Cl. ........................... 407/103; 407/101; 407/102
[58] Field of Search ........................... 407/113, 101–103, 407/34, 53, 47

[56] References Cited

U.S. PATENT DOCUMENTS

| | | |
|---|---|---|
| 1,838,520 | 12/1931 | Archer . |
| 3,268,977 | 8/1966 | Diemond ................................. 407/103 |
| 4,600,341 | 7/1986 | Board . |
| 4,616,962 | 10/1986 | Ushihima et al. ...................... 407/113 |
| 4,966,500 | 10/1990 | Tsujimura et al. . |
| 5,123,787 | 6/1992 | Hunt . |
| 5,145,294 | 9/1992 | Flueckiger . |
| 5,382,118 | 1/1995 | Satran et al. .............................. 407/42 |
| 5,827,016 | 10/1998 | Strand ..................................... 407/113 |

FOREIGN PATENT DOCUMENTS

| | | |
|---|---|---|
| 34 25 012A1 | 1/1985 | Germany . |
| 323 566 | 5/1970 | Sweden . |

*Primary Examiner*—Daniel W. Howell
*Assistant Examiner*—Mark Williams
*Attorney, Agent, or Firm*—Burns, Doane, Swecker & Mathis, L.L.P.

[57] ABSTRACT

A tool for cutting metal machining comprises one or several cutting insert seats (1), each one for an indexable cutting insert, each insert seat comprising a bottom support surface (10) and at least two side surfaces, which form a right angle with each other. One of these side surfaces comprises two side surfaces (12, 16), which are located at different distances from the bottom support surface (10), one of these being intended as a support surface for square cutting inserts and the other as a support surface for specially shaped hexagonal inserts. In this way, one and the same insert seat can accommodate either a square or a hexagonal cutting insert, which considerably improves cutting economy.

21 Claims, 5 Drawing Sheets

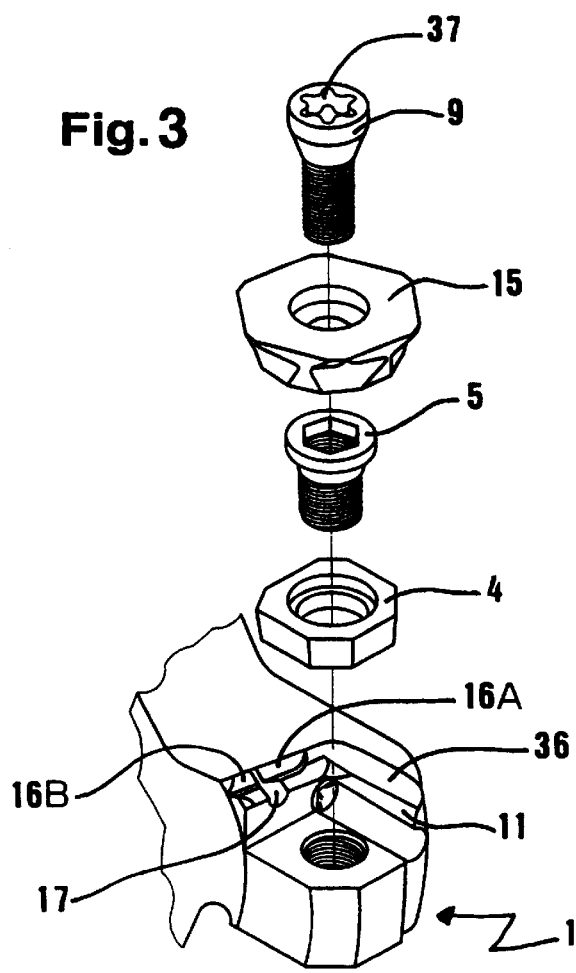
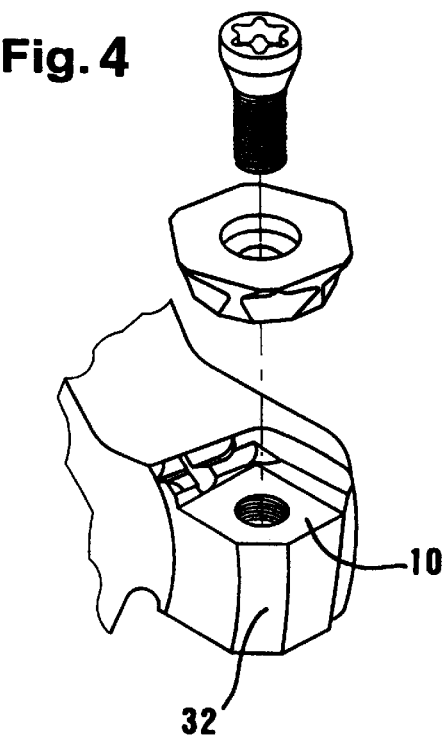
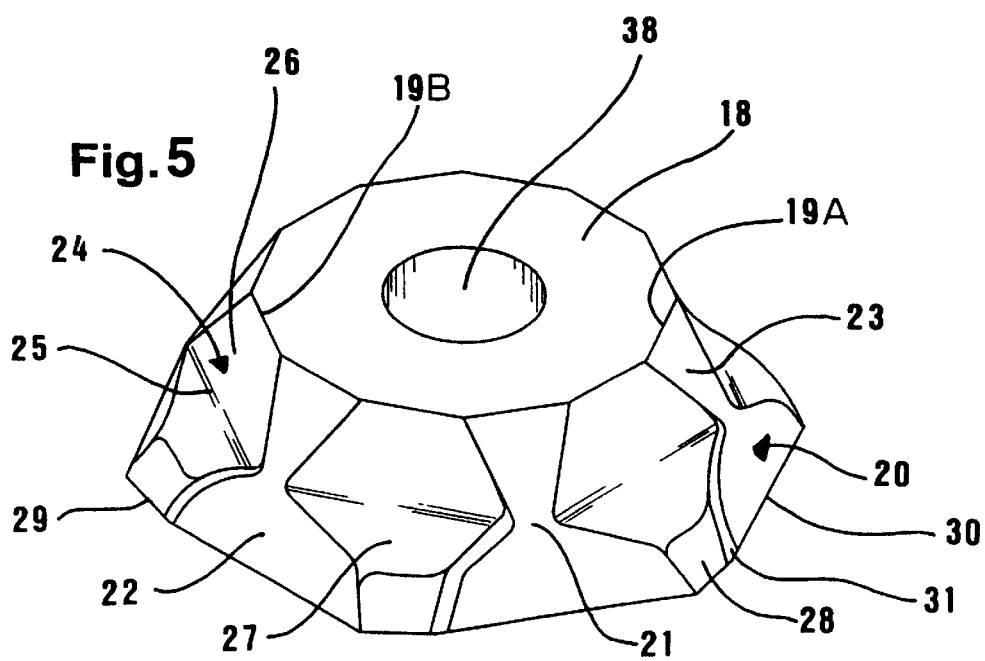

Fig. 6
Fig. 7
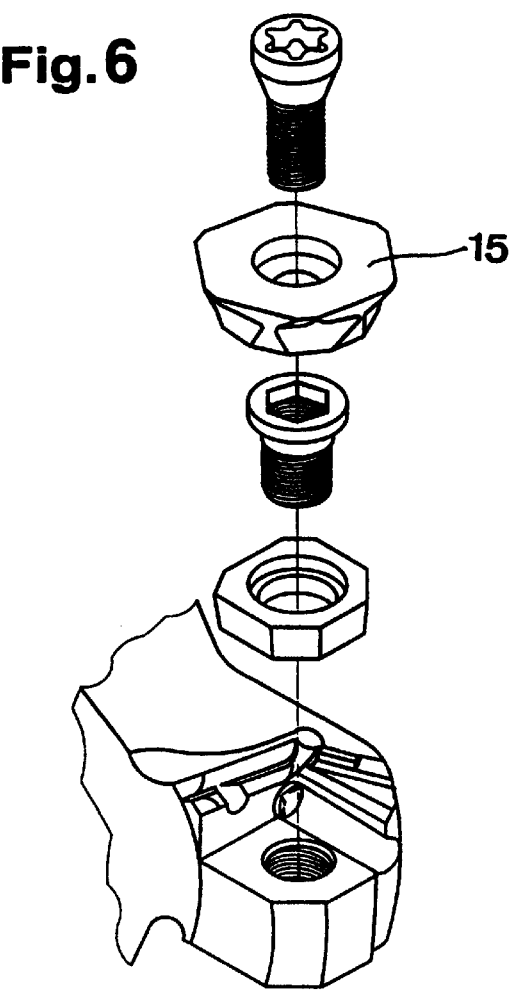
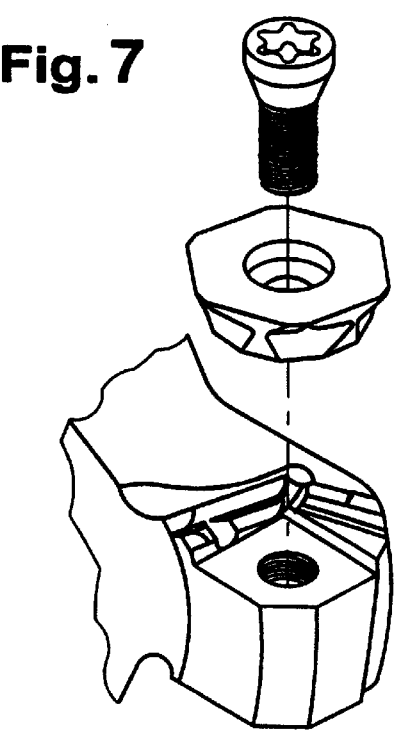
FIG. 8
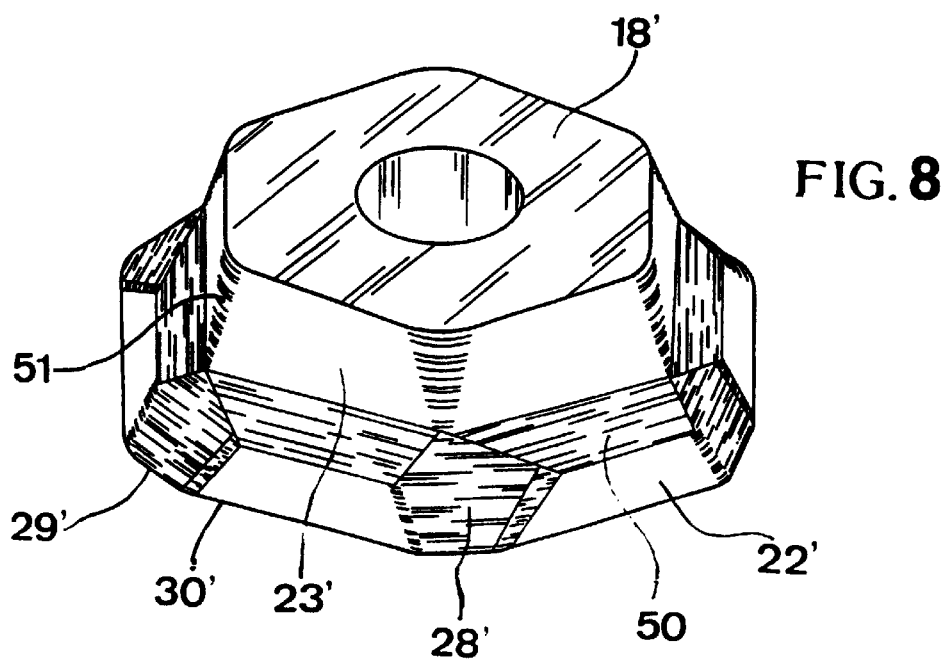

TOOL FOR METAL CUTTING

The present invention relates to a tool for cutting metal machining according to the preamble of claim 1. More specifically, the invention relates to a tool that makes possible a fastening of indexable cutting inserts with different numbers of cutting edges in one and the same insert seat.

The use of detachable, indexable cutting inserts is nowadays common practice for generally all cutting metal machining, i.e. for turning, milling, boring, etc. They are usually made of coated or uncoated cemented carbide, but some ceramic materials also occur. These different indexable cutting inserts may have very varying geometrical basic shapes, depending upon cutting economy and applications. They may e.g. be triangular, rhombic, square, rectangular, round, hexagonal and octagonal. Further, they may be double-sided or single-sided, depending on if cutting edges are present on both sides or only one side.

Common for all possible different insert shapes is that they require an insert seat in the holder per se adapted to the shape of the insert. Thus, square inserts normally require an insert seat with two mutually perpendicular support or bearing surfaces in the insert seat, a round insert requires a round support surface, or at least segments of such a surface, an insert with the shape of a regular hexagon necessitates two support surfaces that are angled by 120° to each other (or two surfaces at a distance that are angled by 60° to each other), etc. This means that a change of insert shape also requires a change of holders. This is time-consuming and, primarily, expensive.

The advantage with, e.g., a hexagonal insert in comparison with a square one, is of course that the hexagonal one has more cutting edges, more precisely for a single-sided insert, two more. Naturally, this involves a better cutting economy, since by one and the same insert, one in principle may extend the working time by 50%. However, some disadvantages with hexagonal cutting inserts is that they do not make possible the same cutting depth as for instance square inserts do (i.e., inserts with the same extension from the middle point to the operative cutting corner), and that they do not make possible 90° milling or turning. Therefore, it is desirable or necessary to sometimes replace for instance square cutting inserts, whereby also the holder has to be replaced, as mentioned above.

For instance, in U.S. Pat. No. 4,966,500 holders are disclosed for different basic shapes of cutting inserts, such as square, hexagonal and octagonal. It may easily be understood that square and octagonal inserts could be fitted into the same insert seats, since both these have cutting edges located perpendicularly to each other. However, hexagonal inserts require their own holders, which may be seen in that citation.

Thus, a first object of the present invention is to improve the cutting economy by optimizing the number of cutting edges in one and the same holder.

A second object of the present invention is to provide an insert seat that may accommodate both square and hexagonal inserts.

Another object of the present invention is to provide a hexagonal insert that may fit in an insert seat for square inserts.

These and further objects have been achieved in a way that is surprising for the skilled man, by constructing a cutting insert seat and a cutting insert, respectively, with the features as defined in the claims 1 and 5.

For illustrative but non-limiting purposes, some preferred embodiments of the invention will now be further described with reference to the appended drawings.

These are herewith briefly presented:

FIG. 3 shows the same insert seat as FIG. 1, but with a hexagonal insert instead of a square one.

FIG. 4 shows the corresponding insert and insert seat as FIG. 3, however without a shim.

FIG. 5 shows the bottom side of a hexagonal insert according to the invention, in a perspective obliquely from above.

FIG. 6 shows the same insert seat as FIG. 2, but with a hexagonal insert instead of a square one.

FIG. 7 shows the corresponding insert and insert seat as FIG. 6, however without a shim.

FIG. 8 shows the bottom side of another embodiment of a hexagonal insert according to the invention, in a perspective obliquely from above.

Figure 1:
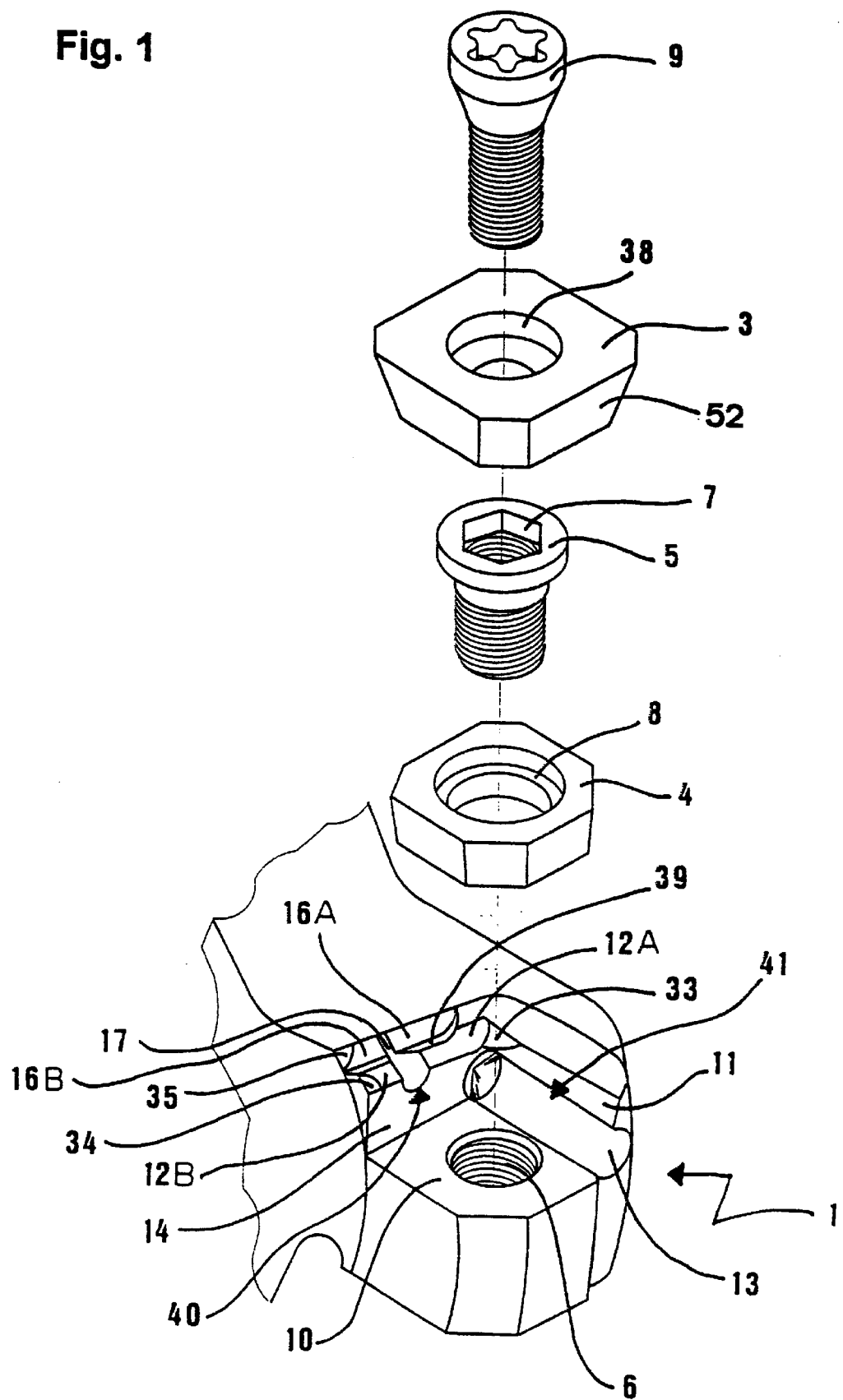
FIG. 1 shows an exploded view of an insert seat according to the invention, in a perspective obliquely from above.

In FIG. 1 a cutting insert seat according to the invention is generally designated by reference numeral 1. As may be seen in FIG. 9, this insert seat is located in a milling cutter body 2, but in principle it may also be placed in, e.g., a boring bar or a drill tip. Basically, the cutting insert seat consists of a bottom support surface 10 and two side surfaces 40 and 41, which are substantially perpendicular to each other. In this insert seat is mounted an indexable cutting insert 3, which according to FIG. 1 has a square basic shape. In order to protect the milling cutter body against any possible insert breakdown, the insert 3 rests upon a shim 4, which normally is also made of cemented carbide. The shim is fastened in the insert seat 1 by an internally and externally threaded shim screw 5, which is tightened into the threaded hole 6 of the insert seat by means of a hexagon key that fits into the hexagonal hole 7. Thereby, the bottom surface of the shim will bear against the bottom support surface 10 of the insert seat. Moreover, the shim bears against the side support surface 14; on the other hand, it usually does not reach the other, lower side surface of the insert seat, in this case the rounded surface 13. According to the exemplified embodiment, the surface 14 consists of a planar surface and the surface 13 of a boring with a sector-shaped cross-section. The central hole of the shim is formed with an abutment shoulder 8, against which the underside of the head of the shim screw 5 abuts. The locking screw 9 is threaded into the inner thread of the shim screw 5 and, thereby, it locks the insert 3, the bottom side of the insert pressing against the top surface of the shim. The head of the locking screw 9 is provided with a recess for tightening, e.g., a so called torx recess 37. When the indexable cutting insert 3 is fastened in the insert seat 1, it will bear against the axial support or abutment surface 11 and the radial support or abutment surfaces 12A and 12B, respectively, which latter two are located in the same plane. All these are angled to the bottom surface 10 by substantially the same angle as the side or relief surfaces 52 of the insert are angled to the bottom surface of the insert. Thus, the angle between said abutment surfaces and the normal of the bottom support surface is between 3 and 30°. Between the cutting edges that are turned inwards and non-operative, and the surfaces above the abutment surfaces 11, 12, is a gap, so that these cutting edges are not damaged. These two gaps 42 and 43 may be seen in FIG. 9.

In FIG. 3 the same insert seat is illustrated as in FIG. 1, but with a hexagonal insert 15 mounted instead of the square insert 3. Thus, the other included machine elements are identical. When this insert is fastened in the insert seat, it will abut on one hand against the axial abutment surface 11, thus against the same surface as the square insert in FIG. 1 abuts against, and on the other hand against the support or abutment surfaces 16A and 16B, which are located in one and the same plane. This plane is substantially plane-parallel to the plane of abutment surfaces 12A, 12B and located somewhat farther away from the axis of the center hole 6, than the latter plane. Between on one hand the surfaces 12A, 12B, and on the other hand the surfaces 16A, 16B, is provided a transition shoulder 39. The surfaces 12A, 12B and 16A, 16B, respectively, are separated from each other by means of a substantially straight milled-out recess 17. This recess need not per se intersect the surface 16, but nevertheless it contributes favourably to providing a statically well-defined two-point abutment radially.

In order to make a cutting insert with the shape of a regular hexagon fit into the insert seat, it should be shaped so that it comprises the features as shown in FIG. 5. The bottom side of the insert has the shape of a dodecagon, and it may be brought to be regular, but preferably it is defined by alternating somewhat shorter and somewhat longer edges 19A and 19B, respectively.

According to the embodiment shown in FIG. 5, the side surfaces 15 of the insert, which hence extend between the bottom surface 18 and the top surface or chip surface, are shaped in a way that will now be described further. From each part edge 19A starts a surface portion 20, which first forms a tapering portion 23, that tapers substantially in the form of a trapezoid or an isosceles frusto-triangle, into a narrower waist portion 21, and then it widens again in the direction of the chip surface, whereby it forms an abutment surface 22, which is intended to bear against the abutment surface 16A, 16B. The intersection line between the abutment surface 22 and the top side of the insert form a main cutting edge 30. It should be pointed out that the part of the abutment surface 22 situated adjacent the main cutting edge 30 does suitably not come in contact with the support surfaces 16, in order not to damage said edge when it has been indexed inwardly in the insert seat. Thus, as may be seen in FIG. 9, the six-edge insert 15 protrudes from the upper delimiting lines of the insert seat (i.e., the upper delimitation line of the support surfaces 16). Suitably, the surface 20 is somewhat convexly curved at the waist portion 21, which may be seen left-most in FIG. 4. Thereby the main cutting edge 30 is strengthened on the relief side, in order to withstand larger cutting forces. If this would not be considered necessary, the knick point at the waist portion could be deleted, whereby the whole "spatulate" surface 20 is in one single plane. For small cutting forces, even an inversion of the waist portion would be feasible, i.e., the waist portion 21 would exhibit a concave radius, corresponding to the radii 25 described below.

Between the surface portions 20, the cutting insert has intermediate portions 24, which have a hexagonal basic shape that is curved substantially along the connection line between two opposed corners. This curving forms a concave radius surface 25. That part of the intermediate portion 24 that adjoins a part-edge 19B constitutes an abutment surface 26, which may be brought to bear against the axial support surface 11. However, suitably, the whole abutment surface 26 is not intended to bear against the support surface 11. More specifically, the part of the surface 26 situated adjacent the edge 19B will not cooperate with said support surface, but rather the part located nearer the radius surface 25. The transition surface 27 protruding from the center of the insert constitutes a free-surface, whose width decreases from the radius surface 25 in the direction of the chip surface of the insert. Between this transition surface and the chip surface there is a parallel land 28, whose secondary land cutting edge 29 generates a smooth surface on the workpiece, in a manner known per se. In the transitional region between the appurtenant abutment surface 22 and the parallel land 28, there is preferably a transition surface 31, which either is planar or has a radius. Further, this surface 31 is somewhat more inclined in relation to the normal of the bottom surface than is the abutment surface 22, in this way allowing for a sufficient clearance behind the cutting edge of the parallel land (axially).

A characteristic, combinatory double effect of the present invention is realized by the existence of on one hand the recess or milled-out recess 17 in the one support surface of the insert seat, and on the other hand the "spatulate" surface portion 20 on the hexagonal cutting insert 15. By shaping the former sufficiently broad and the latter sufficiently narrow at the waist portion 21, said waist portion may be fitted into and go free from the recess 17, and thus be countersunk between the support surface portions 12A, 12B. Thereby, the feature characteristic for the present invention is achieved, that support surfaces on different levels may be used for different insert shapes.

Above the axial support surface 11 there is an elongated intermediate surface 36, which is located substantially on the same height from the bottom support surface 10 as the support surfaces 16A, 16B. This intermediate surface 36 is to be considered as a mere free-surface, without any contact to a mounted cutting insert.

In FIGS. 1 and 3 (and also in FIGS. 2 and 6) embodiments are illustrated comprising a shim 4. However, this is not an essential feature of the present invention, which also comprises constructions without such a shim. Such a one is shown in FIG. 4. The only difference between this figure and FIG. 1 and 3 is that the bottom support surface 10 protrudes by a height difference corresponding to the thickness of the shim. This brings about the advantage per se that the material thickness in the insert-carrying protrusion 32 becomes thicker and, thereby, stronger.

As may be best seen in FIG. 1, one or several of the support surfaces 11, 12 and 16 may be provided with sparing surfaces 33, 34 and 35, respectively. These are arranged so that the side edges shall not be capable of causing intrusions in the insert seat, thereby damaging it in the long run.

Figure 9:
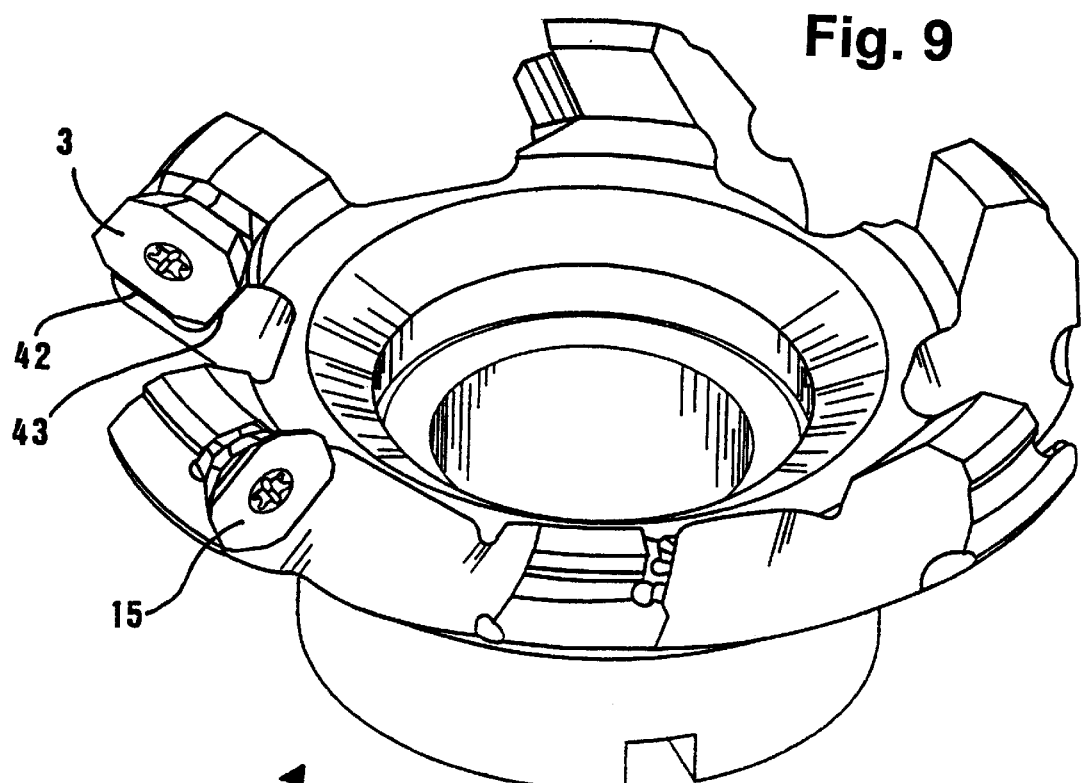
FIG. 9 shows a milling cutter body with cutting insert seats according to the invention according to FIG. 1, a square and a hexagonal insert having been mounted.

FIG. 9 shows a milling cutter body with six identical cutting insert seats, which are shaped to correspond the embodiment according to FIG. 1 and 3. In the figure, two of these are equipped, one with an indexable cutting insert of a square basic shape and one with an indexable cutting insert of a hexagonal basic shape. However, this is not a combination that is used for a real machining step, but is to be seen as a mere illustration of the basic concept of the present invention.

According to the illustrated embodiments, the support surface 11, that is common for the two insert types, is the axial support surface. However, it may easily be realized that the locations of the side surfaces may be converted, whereby the support surface 11 would become the radial support surface and the support surfaces 12 and 16 axial support surfaces.

Figure 2:
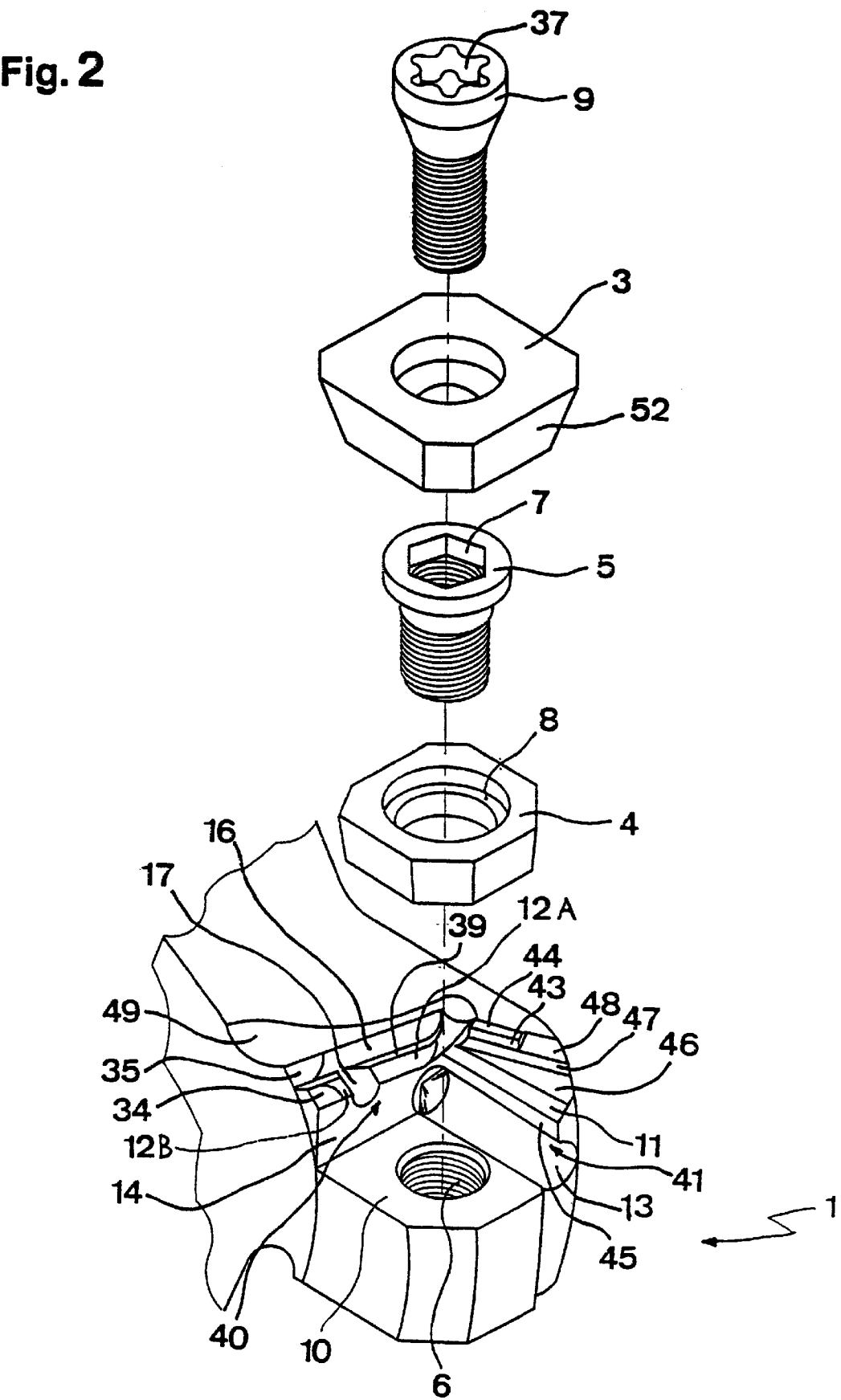
FIG. 2 shows an exploded view of a somewhat modified insert seat according to the invention, in perspective obliquely from above.
Figure 10:
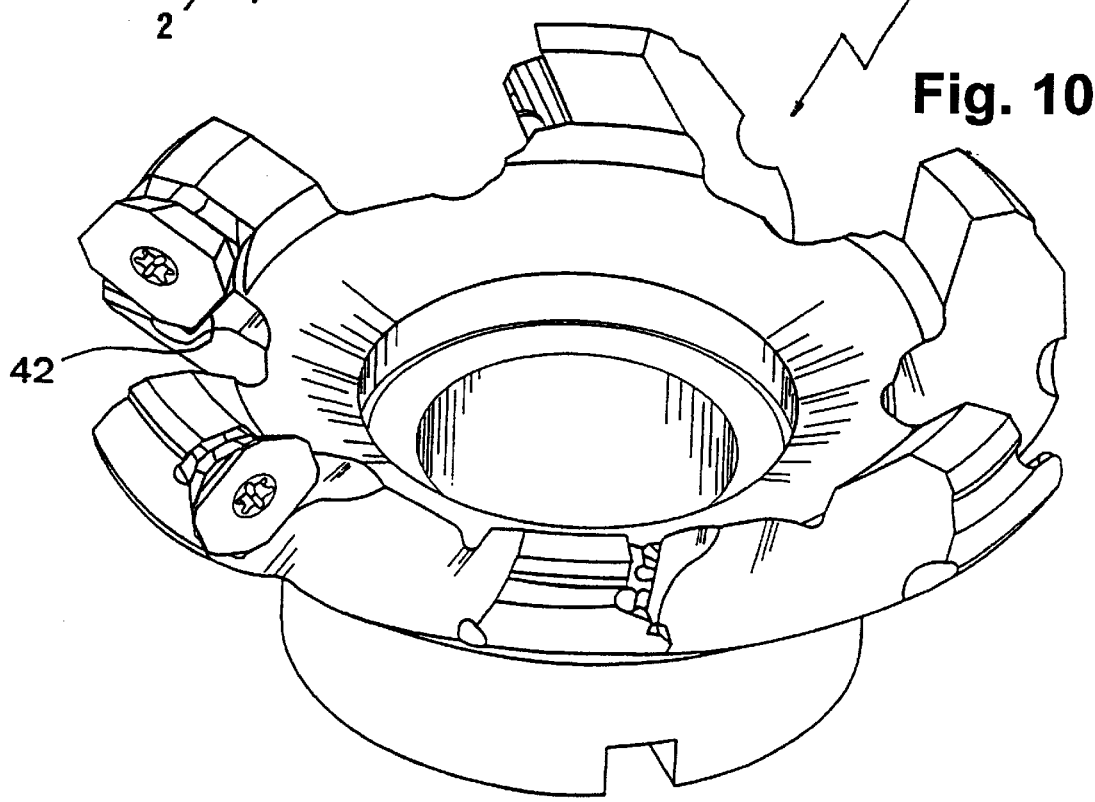
FIG. 10 shows a milling cutter body with insert seats according to the invention according to FIG. 2, a square and a hexagonal insert having been mounted.

FIG. 2 and the appurtenant FIGS. 6, 7, 8 and 10 show an embodiment of the invention that is somewhat modified relative to FIG. 1. Corresponding details have been designated with the same reference numerals as in the corresponding FIGS. 1, 3, 4, 5 and 9. One difference between FIG. 9 and 10 is that in FIG. 10 only one cutting-edge-protecting gap (gap 42) exists, which is located between one of the non-active cutting edges of the insert, being directed inwardly, and the surface above the abutment surfaces 12.

In FIG. 6 is illustrated the same insert seat as in FIG. 2, but with a hexagonal cutting insert 15' mounted, instead of the square insert 3. Thus, the other included machine elements are identical. When this cutting insert is fastened in the insert seat, it will bear on one hand against the axial abutment surface 43, and on the other hand against the support or abutment surface 16. The plane of the surface 16 may be substantially plane-parallel with the planes of the abutment surfaces 12A, 12B and located somewhat farther from the axis of the center hole 6, than the latter plane. The angle of the plane 16 to the normal of the bottom surface 10 can be somewhat smaller than the angle of the corresponding abutment surface 22 on the insert, which in principle permits a linear abutment between the cutting insert and the upper delimitation line of the abutment surface 16. The level of said delimitation is determined by the formation of the milled-out free-surface 49.

In order to make a cutting insert of a regular hexagonal shape fit into this insert seat, it shall be formed so that it comprises the features as depicted in FIG. 5 or 8. The cutting insert according to FIG. 5 has already been described above. However, by the somewhat modified insert seat according to FIG. 2, it will rest in a somewhat different way, as described below.

In combination with FIG. 2, the surfaces 22 are intended to abut on one hand against the abutment surface 16 (or against its upper delimitation line) and on the other hand against the abutment surface 43, which are angled substantially by 120° to each other. As mentioned above, the part of the abutment surface 22 located adjacent the main cutting edge 30 should not come in contact with the support surface 16, in order not to damage said cutting edge when it has been indexed inwardly into the insert seat. Of the same reason, there is preferably a free-surface 44 above the abutment surface 43. However, the surface 44 is not necessary, cf. FIG. 7.

According to FIG. 1, that part of the intermediate portion 24 that adjoins a part-edge 19B constitutes an abutment surface 26, which is brought to abut against the same axial abutment surface as the square cutting insert. Admittedly, this brings the inconvenience that the insert has to be ground considerably, since abutment surfaces usually have to be ground. According to FIG. 2, only the circumferential, cutting-edge-adjacent surfaces 22 function as abutment surfaces, which makes the insert considerably more easily ground.

The cutting insert according to FIG. 8, whose bottom surface has the shape of a substantially regular hexagon with rounded corners, is described below.

According to FIG. 8, the spatulate surface 20 has been replaced by an abutment surface 22', a transition surface or free-surface 50 that is angled inwardly towards the center of the insert, and a free-surface 23' extending between surface 50 and the bottom surface of the insert. The bottom surface 18' has the shape of a regular hexagon with rounded corners. Between two adjacent free-surfaces 23', there are provided rounded radius surfaces 51, which in principle replace the intermediate portions 24 in FIG. 5. The parallel lands 28' and the transition surfaces 31' correspond to details 28 and 31, respectively, in FIG. 5. According to this embodiment, the transition surfaces 50 are considerably angled towards the center of the insert, so that they, and also the free-surfaces 23', do not come in contact with the facing surfaces in the insert seat, in first hand the surfaces 12 and 14, and 11, 15 and 46, respectively. Also this embodiment has the endeavoured feature, that all side abutment surfaces of the insert (i.e., the surfaces 22') are located at the top, along the cutting edges, which makes the cutting insert easy to grind.

Between the axial support surface 11 for square inserts and the round surface 13, there is a free-surface 45. At the opposed side of the support surface 11, there is arranged a transition surface 46, which is substantially plane-parallel with the bottom supports surface 10. Between this one and the support surface 43 for hexagonal inserts, extends another transition surface 47, which forms an obtuse angle relative to both surfaces 43 and 46. Adjacent to the surfaces 43, 44 and at the same distance as those from the bottom support surface 10, there is a free-surface 48. As may be easily understood, the hexagonal insert according to FIG. 8 and the insert seat are mutually so shaped, that the insert goes free from all surfaces below the support surface 43, i.e. surfaces 13, 45, 11, 46 and 47, and of course also from the laterally arranged surface 48.

Furthermore, according to the illustrated embodiments the indexable cutting inserts have been provided with a through central hole 38 for the fastening by a locking screw. However, this has nothing to do with the ingenious location of the support surfaces in the insert seat, wherefore also other clamping arrangements are feasible, such as a center pin or a lever pin, and also such constructions that do not require any central hole in the insert, e.g. a wedge or a pressing clamp.

We claim:

1. Tool for cutting metal machining comprising at least one cutting insert seat for accommodating at least one indexable cutting insert, the at least one insert seat including a bottom support surface and at least two side surfaces, the at least two side surfaces forming a substantially right angle with each other and include support surfaces adapted to bear against the cutting insert mounted in the insert seat, one of the at least two side surfaces including at least two support surfaces, the at least two support surfaces being located at different distances from a plane of the bottom support surface, one of the at least two support surfaces being shaped to support cutting inserts of a substantially square basic shape and another of the at least two support surfaces being shaped to support cutting inserts of a substantially hexagonal basic shape.

2. Tool according to claim 1, wherein another side surface of the at least two side surfaces has at least one support surface being shaped to support both cutting inserts of a substantially square basic shape and cutting inserts of a substantially hexagonal basic shape.

3. Tool according to claim 1, wherein at least the support surface for the insert of a substantially square basic shape is divided into two part support surfaces by a recess.

4. Tool according to claim 1, wherein the at least two support surfaces on one of the at least two side surfaces are substantially plane-parallel.

5. Tool according to claim 1, wherein the support surface for the insert of a substantially hexagonal basic shape is divided into two part support surfaces by a recess.

6. Tool according to claim 1, wherein the support surface for the insert of a substantially square basic shape is divided into two part support surfaces by a recess, the recess also dividing the support surface for the insert of a substantially hexagonal basic shape into two part support surfaces.

7. Tool according to claim 1, wherein the at least two support surfaces on one of the at least two side surfaces are substantially plane-parallel, the support surface for the insert of substantially hexagonal basic shape being located at a larger distance from a middle point of the bottom support surface than the support surface for the insert of a substantially square basic shape.

8. Tool for cutting metal machining comprising at least one cutting insert seat for accommodating at least one indexable cutting insert, the at least one insert seat including a bottom support surface and at least two side surfaces the at least two side surfaces forming a substantially right angle with each other and include support surfaces which are adapted to bear against the cutting insert mounted in the insert seat, the at least two side surfaces each including at least two support surfaces located at different distances from a plane of the bottom support surface of the at least two support surfaces being shaped to support cutting inserts of a substantially square basic shape and another support surface of the at least two support surfaces being shaped to support cutting inserts of a substantially hexagonal basic shape.

9. Tool according to claim 8, wherein the support surface for the insert of a substantially square basic shape is divided into two part support surfaces by a recess.

10. Indexable cutting insert of a substantially hexagonal basic shape for cutting metal machining comprising a bottom surface, a top or chip surface, and a configuration of side surfaces extending therebetween, the configuration of side surfaces including at least six first abutment surfaces, each abutment surface of the at least six first abutment surfaces being located proximate a main cutting edge, and the configuration of side surfaces including at least six second abutment surfaces located proximate an intersection line of the configuration of side surfaces with the bottom surface.

11. Indexable cutting insert according to claim 10, wherein the intersection line between the bottom surface and the configuration of side surfaces describes a dodecagon.

12. Indexable cutting insert according to claim 10, wherein a center of each first abutment surface of the at least six first abutment surfaces is disposed substantially midway between two succeeding second abutment surfaces of the at least six second abutment surfaces.

13. Indexable cutting insert of a substantially hexagonal basic shape for cutting metal machining comprising a bottom surface, a top or chip surface, and a configuration of side surfaces extending therebetween, the configuration of side surfaces including at least six first abutment surfaces, each abutment surface of the at least six first abutment surfaces being located proximate a main cutting edge, and the configuration of side surfaces including at least six second abutment surfaces located proximate an intersection line of the configuration of side surfaces with the bottom surface wherein each first abutment surface of the at least six first abutment surfaces forms part of a corresponding first surface portion of a plurality of first surface portions, and each second abutment surface of the second abutment surfaces forms part of a corresponding second intermediate surface portion of a plurality of corresponding second intermediate surface portions, each intermediate surface portion of the plurality of second intermediate surface portions being located between two of the first surface portions.

14. Indexable cutting insert according to claim 13, wherein a land is disposed between two first abutment surfaces of the at least six first abutment surfaces and a second intermediate surface portion of the plurality of second intermediate surface portions.

15. Indexable cutting insert according to claim 13, wherein the first surface portions include a waist portion having a convex radius, and that a second intermediate surface portion has a concave radius.

16. Indexable cutting insert according to claim 15, wherein the second intermediate surface portion has a substantially hexagonal basic shape, the concave radius extending between two opposed corners of the hexagonal basic shape.

17. Indexable cutting insert of a substantially hexagonal basic shape for cutting metal machining comprising a bottom surface, a top or chip surfaces, and a configuration of side surfaces extending therebetween, the configuration of side surfaces including at least six abutment surfaces, each abutment surface of the at least six abutment surfaces being located proximate a main cutting edge, and at least six other surfaces which are unground and are disposed proximate an intersection line of the configuration of side surfaces with the bottom surface.

18. Indexable cutting insert according to claim 17, wherein, underneath each abutment surface, a transition surface is disposed and is angled downwards-inwards toward a center of the cutting insert, and wherein, below the transition surface, a free-surface extending to the bottom surface of the cutting insert is disposed.

19. Indexable cutting insert according to claim 17, wherein each abutment surface of the at least six abutment surfaces forms part of a first surface portion of a plurality of first surface portions, and that each other surface of the at least six other surfaces forms part of a second intermediate surface portion, each second intermediate surface portion being located between two first surface portions of the plurality of first surface portions.

20. Indexable cutting insert according to claim 17, wherein the intersection line between the bottom surface and the configuration of side surfaces describes a substantially regular hexagon with rounded corners.

21. Indexable cutting insert according to claim 17, wherein a land is disposed between two abutment surfaces of the at least six abutment surfaces.

* * * * *